(12) United States Patent
Takahashi et al.

(10) Patent No.: US 8,681,289 B2
(45) Date of Patent: Mar. 25, 2014

(54) LIGHTING DEVICE AND LIQUID CRYSTAL DISPLAY APPARATUS COMPRISING THE SAME

(75) Inventors: Ken Takahashi, Kumagaya (JP); Osamu Ono, Fukaya (JP); Hidemi Matsuda, Toda (JP); Nobuo Kawamura, Kumagaya (JP); Shusuke Morita, Fukaya (JP); Masahiro Yokota, Fukaya (JP); Takashi Nishimura, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 34 days.

(21) Appl. No.: 13/617,595

(22) Filed: Sep. 14, 2012

(65) Prior Publication Data
US 2013/0010232 A1 Jan. 10, 2013

Related U.S. Application Data

(63) Continuation of application No. PCT/JP2011/054876, filed on Mar. 3, 2011.

(30) Foreign Application Priority Data

Sep. 16, 2010 (JP) .................................. 2010-208545

(51) Int. Cl.
*G02F 1/1335* (2006.01)
*F21V 1/00* (2006.01)
*F21V 13/00* (2006.01)

(52) U.S. Cl.
USPC .................. 349/61; 349/62; 349/64; 362/235; 362/243

(58) Field of Classification Search
CPC .................... G02F 1/133615; G02F 1/133603; G02F 1/133604; G02F 1/133606; G02F 1/133607; G02F 1/133611; G02B 6/0053; G02B 6/0038
USPC .................... 349/61, 62, 64; 362/235, 243
See application file for complete search history.

(56) References Cited

U.S. PATENT DOCUMENTS 5,768,023 A * 6/1998 Sawaki et al. ................. 359/622
7,400,439 B2 * 7/2008 Holman ....................... 359/298

FOREIGN PATENT DOCUMENTS

JP 2006-156187 A 6/2006
JP 2009-48955 A 3/2009
(Continued)

OTHER PUBLICATIONS

English translation of the International Preliminary Report on Patentability issued Apr. 18, 2013, in PCT/JP2011/054876, filed Mar. 3, 2011.
English translation of the Written Opinion of the International Searching Authority issued Apr. 19, 2011, in PCT/JP2011/054876, filed Mar. 3, 2011.

(Continued)

*Primary Examiner* — Mike Qi
(74) *Attorney, Agent, or Firm* — Oblon, Spivak, McClelland, Maier & Neustadt, L.L.P.

(57) ABSTRACT

According to one embodiment, a lighting device includes a radiation surface, at least one light source provided to face the radiation surface, and an optical control member provided between the radiation surface and the light source and includes optical characteristics of transmission, diffraction, diffusion, and reflection, which vary for regions in the optical control member, a distribution of each of the optical characteristics being determined by positions relative to the at least one light source. The optical control member is formed in a sheet shape which is controlled by at least one of a reflective film having a reflection factor distribution, and a reflective film having a numerical aperture distribution, and lenses.

17 Claims, 13 Drawing Sheets

(56) References Cited

FOREIGN PATENT DOCUMENTS

| JP | 4290887 | 4/2009 |
| JP | 4365884 | 8/2009 |
| JP | 2010-49937 A | 3/2010 |
| JP | 2010-113975 A | 5/2010 |
| JP | 2010-153328 A | 7/2010 |

OTHER PUBLICATIONS

International Search Report mailed on Apr. 19, 2011, issued for International Application No. PCT/JP2011/054876, filed on Mar. 3, 2011 (with English translation).

International Written Opinion mailed on Apr. 19, 2011, issued for International Application No. PCT/JP2011/054876, filed on Mar. 3, 2011.

* cited by examiner

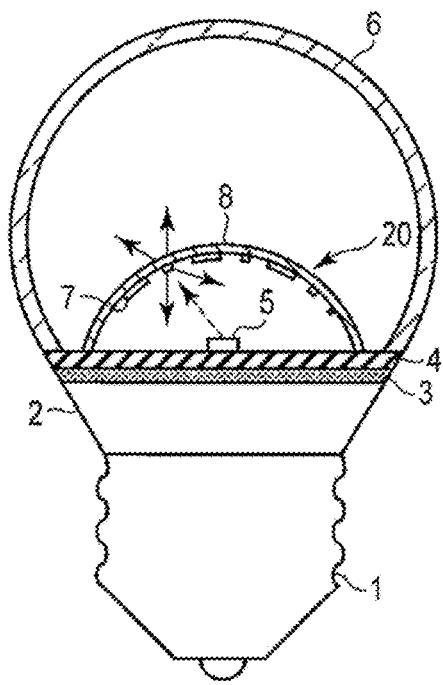
F I G. 1A
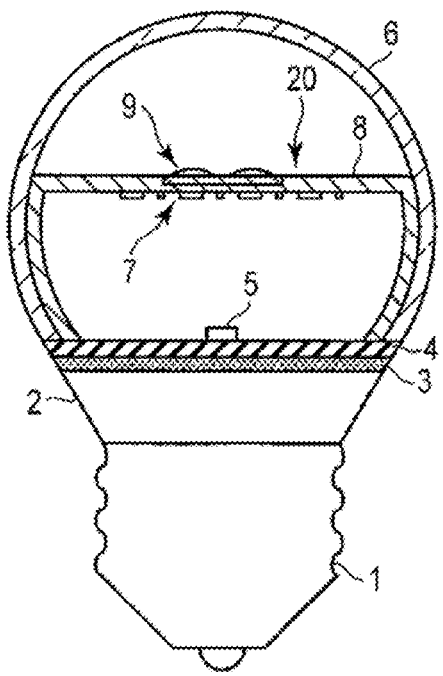
F I G. 1B

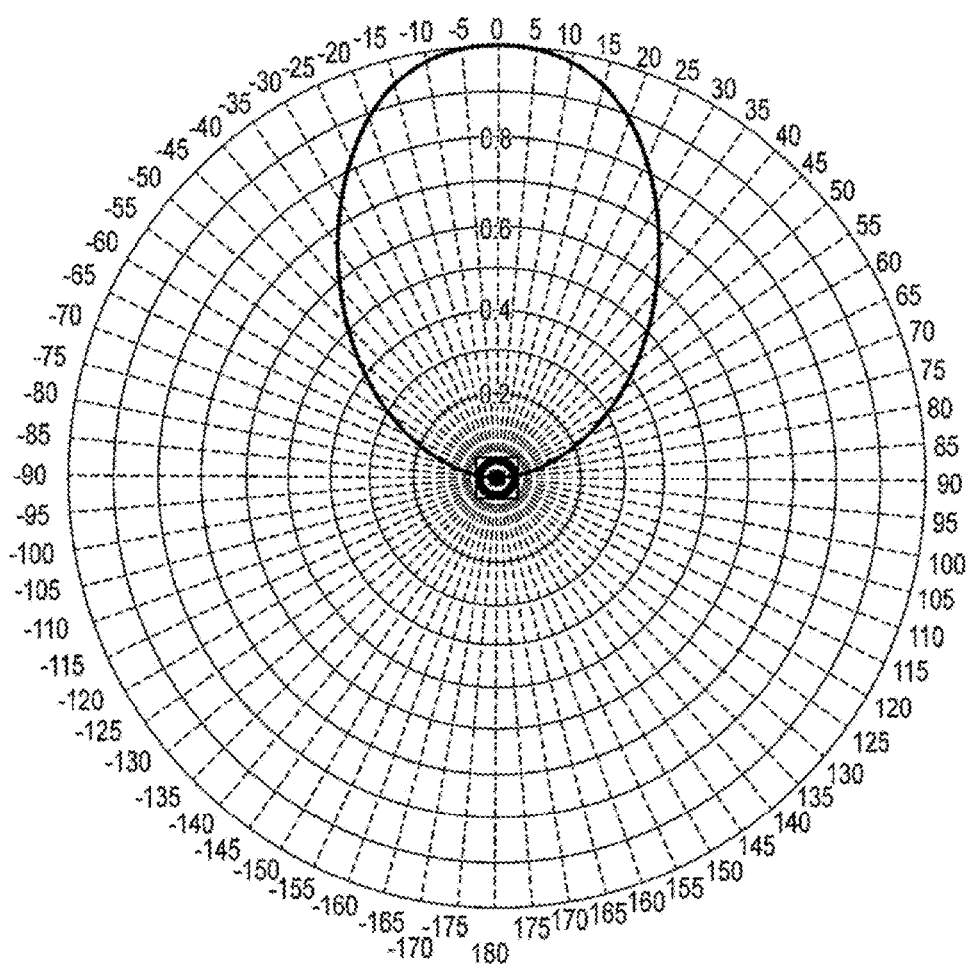
F I G. 2A

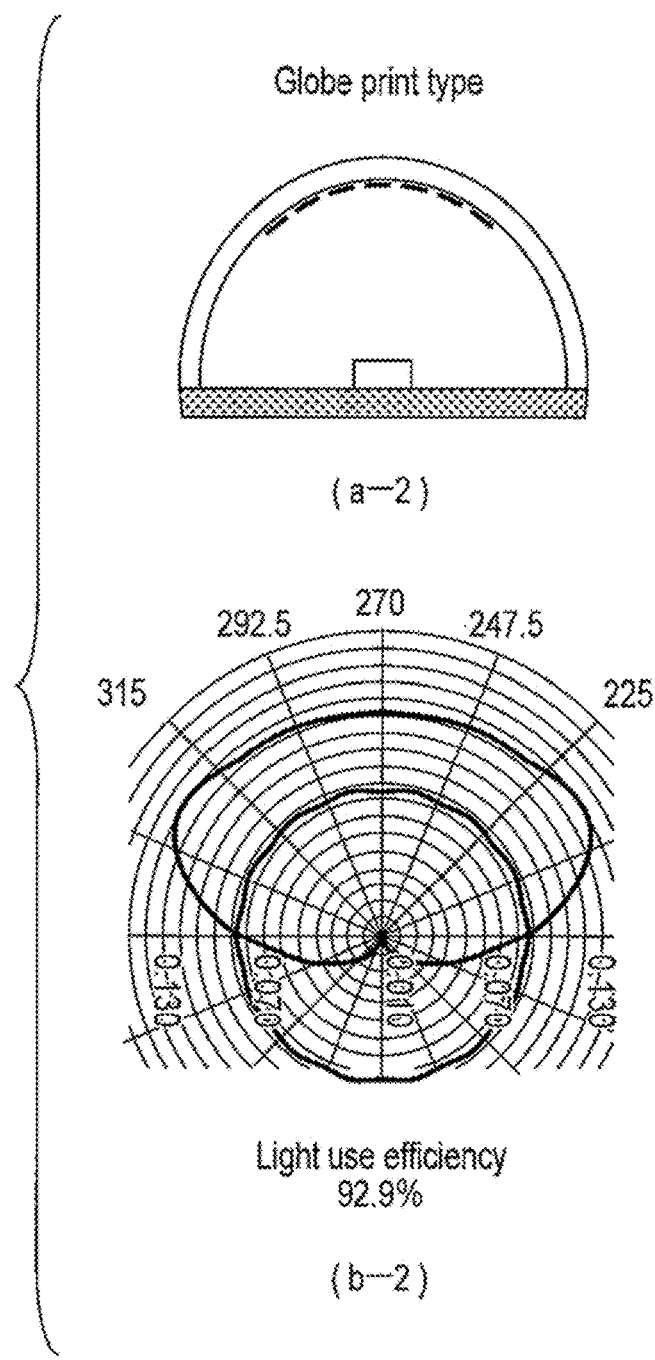
F I G. 3B

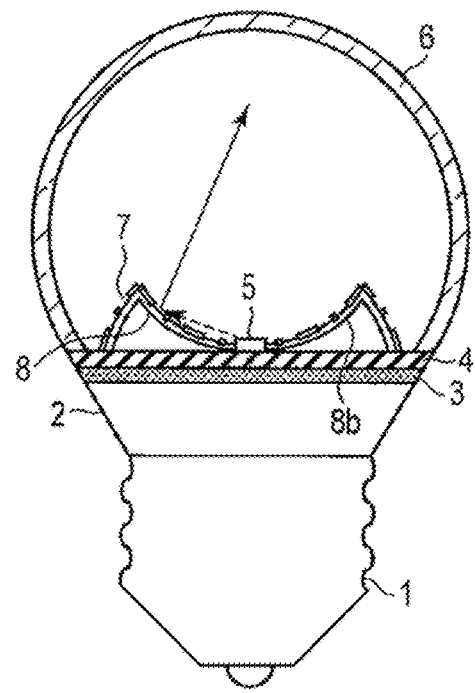
F I G. 5A
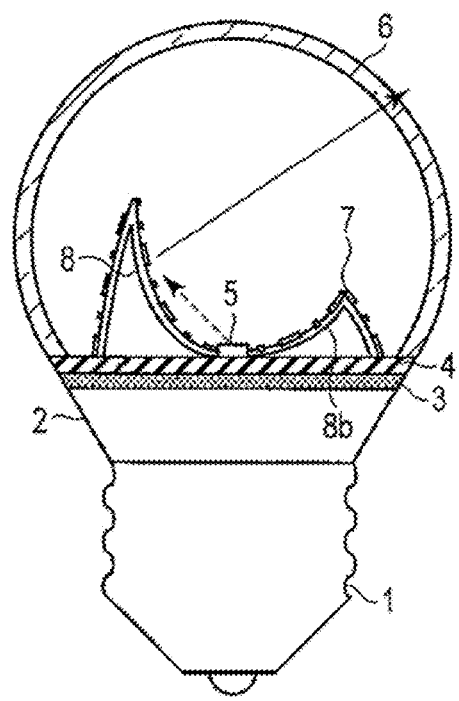
F I G. 5B

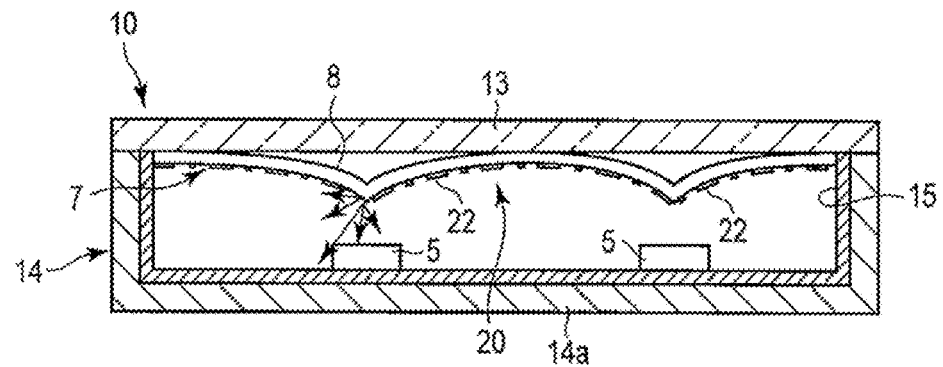
F I G. 6A
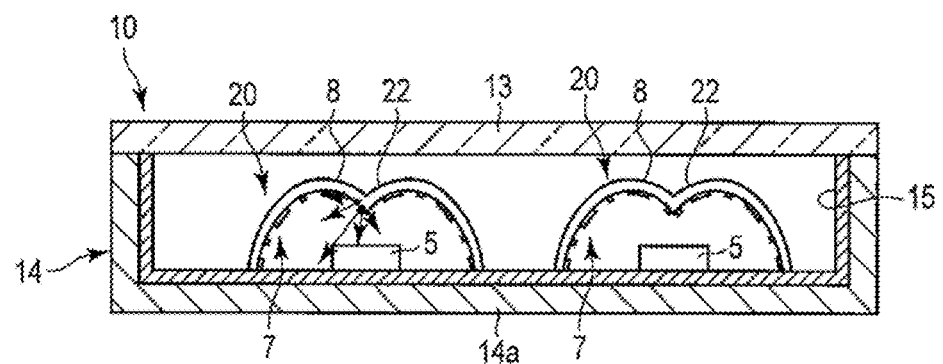
F I G. 6B
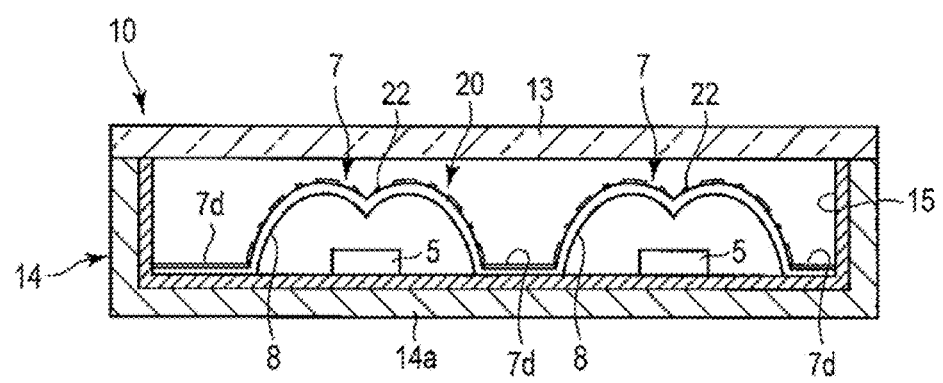
F I G. 6C

LIGHTING DEVICE AND LIQUID CRYSTAL DISPLAY APPARATUS COMPRISING THE SAME

CROSS REFERENCE TO RELATED APPLICATIONS

This application is a Continuation Application of PCT Application No. PCT/JP2011/054876, filed Mar. 3, 2011 and based upon and claiming the benefit of priority from Japanese Patent Application No. 2010-208545, filed Sep. 16, 2010, the entire contents of all of which are incorporated herein by reference.

FIELD

Embodiments described herein relate generally to a lighting device and to a liquid crystal display apparatus using the lighting device.

BACKGROUND

A lighting device is an apparatus which radiates that light from a planer light emitting surface, which is emitted from a light source. Such a lighting device is not only solely used as a lighting device but also used in a liquid crystal display apparatus in combination with a liquid crystal display panel.

The lighting devices include a bulb-type lighting device each comprising a hemispherical or bulb-type light emitting surface, and a planar lighting device having a flat light emitting surface. In recent years, a light emitting diode (LED) is frequently used as a light source. A variety of lighting devices using an LED have been proposed. LEDs provide features such as easy light modulation and easy maintenance but a problem occurs when an LED is applied to a conventional lighting device.

Concerning the bulb-type lighting device, the directivity of light from an LED light source deviates in the frontal direction. Uniform light distribution is therefore difficult to achieve unlike a conventional incandescent bulb or fluorescent bulb. Hence, a measure has been proposed to achieve a uniform light distribution by using, as a lighting device which achieves the required light distribution, an LED board in the shape of a polyhedron.

Lighting devices are categorized into a directly-under type in which light sources are arranged in a plane directly under a light emitting surface, and a side type in which light sources are arranged on a side of a plate-type light guide member. The directly-under-type-planar lighting device achieves excellent light use efficiency, and the side-type planar display apparatus has excellent thinness. Because of the high light use efficiency and simple structure, the directly-under-type lighting device is more prevalent, although thinning has been strongly demanded for the directly-under-type lighting device. In this case, the LED light source gives rise to a problem of high directivity and easily causes an uneven luminance in which the luminance increases just above the light source in a light emitting surface. Therefore, in order to uniformly equalize the luminance in the light emitting surface, the lighting device needs to be thick, which hinders thinning of the lighting device.

In respect of the bulb-type lighting device, the manufacture of a polyhedral board is complicated, and heat radiation needs to be ensured while maintaining the mechanical strength of a board supporting part. Thus, product design is highly complex. As another method, reflection of light within an outer container may be increased by using a highly diffusive material for the outer container surrounding an LED board. However, reducing the directivity of an LED light source merely via the diffusibility of the outer container is limited. There is a further problem in that the efficiency of extracting light deteriorates as the number of times of reflection within the outer container increases more than required.

BRIEF DESCRIPTION OF THE DRAWINGS

FIG. 1A is a sectional view of a lighting device according to a first embodiment;

FIG. 1B is a sectional view of a lighting device according to a first modification;

FIG. 2A shows measured values of light distribution of a lighting device according to a comparative example comprising no optical control member;

FIG. 3B shows a schematic configuration and light use efficiency of a lighting device according to a comparative example;

FIG. 5A is a sectional view of a lighting device according to the third modification;

FIG. 5B is a sectional view of a lighting device according to the fourth modification;

FIG. 6A is a sectional view of a planar lighting device according to the second embodiment;

FIG. 6B is a sectional view of a planar lighting device according to the fifth modification;

FIG. 6C is a sectional view of a planar lighting device according to the sixth modification;

DETAILED DESCRIPTION

Figure 1C:
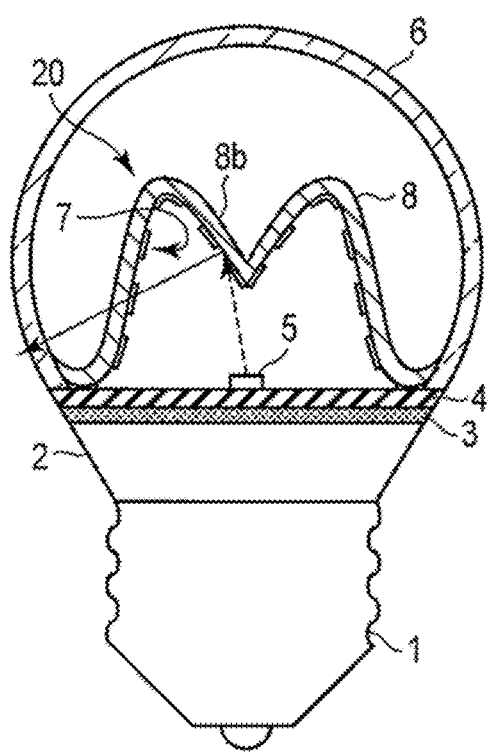
FIG. 1C is a sectional view of a lighting device according to a second modification.

In general, according to one embodiment, a lighting device comprises: a radiation surface; at least one light source provided to face the radiation surface; and an optical control member provided between the radiation surface and the light source and comprising optical characteristics of transmission, diffraction, diffusion, and reflection, which vary for regions in the optical control member, a distribution of each of the optical characteristics being determined by positions relative to the at least one light source. The optical control member is formed in a sheet shape which is controlled by at least one of a reflective film having a reflection factor distribution, and a reflective film having a numerical aperture distribution, and lenses. The optical control member comprises a group of patterns in a micro cycle, and a distance between the optical control member and the radiation surface is greater than the cycle of the group of patterns Hereinafter, a planar lighting device according to an embodiment will be described, referring to the drawings.

FIG. 1A is a sectional view of a lighting device comprising an optical control member according to a first embodiment.

According to the present embodiment, a bulb-type lighting device comprises: a flat circuit board 3; an lower reflector 4 formed on an upper surface of the circuit board 3; one or more point light sources 5 mounted on the circuit board 3; a dome-type globe, i.e., an envelope 6 which is provided in the side of the point light sources 5 where light is extracted, and covers the point light source 5 and the lower reflector 4; a transparent or translucent sheet 8 arranged between the point light source 5 and the envelope 6; a heat radiator 2 provided in the undersurface side of the circuit board 3; and a bulb metal 1. The envelope 6 is made of a transparent or translucent material, such as glass, and an outer surface of the envelope 6 forms a radiation surface of the lighting device.

The translucent sheet 8 is a molded product of a 0.3 mm thick polycarbonate (PC) sheet, and a transmissive reflective layer 7 is formed on a surface thereof in the side of the point light sources 5. The transmissive reflective layer 7 may be formed in either one or both of the side of the light source and the side of the envelope of the translucent sheet 8. The translucent sheet 8 has a shape formed by an existing molding method, such as vacuum molding or pressure forming. In the embodiment, the translucent sheet 8 is formed in a substantially hemispherical shape, and is provided so as to cover the point light source 5. Although the translucent sheet 8 can be molded either before or after formation of the transmissive reflective layer 7, a process of molding after printing is relatively simple for a complicated shape.

A desirable material for the translucent sheet 8 is polycarbonate (PC), polymethyl methacrylate (PMMA), polyethylene terephthalate (PET), polystyrene (PS), or cyclic olefin copolymer (COC) since high transmissivity is considered important. However, when the sheet is provided in the side of the circuit board 3 whose temperature is high, the foregoing PC is most desirable. The diffusibility of transmitted light of the translucent sheet 8 can be increased via inclusion of scattering particles if needed, which can reduce luminance unevenness of the whole lighting device, as well as enable the light distribution to be variously changed.

The translucent sheet 8 is fixed to the circuit board 3 or the envelope 6 by a method not shown, such as a resin adhesive or clamping. The translucent sheet 8 desirably has a thickness of about 0.1 to 1.0 mm to make the sheet suitable for general purpose use, and can be arbitrarily selected to comply with the processability of the transmissive reflective layer 7. The translucent sheet 8 and the transmissive reflective layer 7 formed thereon form the sheet-type optical control member 20.

According to the lighting device configured as described above, light which comes out of the point light source 5 reaches the transmissive reflective layer 7. The light which has reached the transmissive reflective layer 7 (denoted by an arrow of a broken line in the figure) is partially transmitted and partially reflected, and is diffused about the surface normal direction of the transmissive reflective layer 7 as a main axis (denoted by an arrow of solid line in the figure). Therefore, the transmissive reflective layer 7 receives the light from the point light source 5 and behaves just like a second surface light source. Moreover, if a pattern having an opening which transmits light is formed in the transmissive reflective layer 7, the light penetrates the opening, maintaining the original direction of the light.

As described above, in the optical control member 20 which comprises the translucent sheet 8 and the transmissive reflective layer 7, optical characteristics of transmission, diffraction, diffusion, and reflection vary, and distribution of the optical characteristics are determined by positions relative to the single point light source 5. The distribution is controlled by at least one of a reflective film having a reflection factor distribution and a reflective film or a lens having an open aperture ratio distribution. In this manner, the light distribution of light extracted from the point light source 5 by the envelope 6 is transformed, and the light finally emitted from the envelope 6 attains a desired light distribution by properly controlling the transmissive reflective layer 7.

Usually, the light emitted from the point light source 5 such as an LED has a distribution maximized directly above (at a center part) of the light source, and the light distribution characteristics range between 100 to 160 degrees at full angle at half maximum. If the light distribution is to be extended to sides of the bulb or in backward directions thereof, a reflection factor directly above the light source of the transmissive reflective layer 7 needs to be locally increased. Therefore, opening patterns whose numerical apertures differ depending on positions are formed in the transmissive reflective layer 7, and the reflection factor and transmissivity are controlled by controlling the numerical apertures. The transmissive reflective layer 7 has a group of opening patterns in a micro cycle, and a gap between the optical control member 20 and a radiation surface is formed to be greater than the cycle of the group of opening patterns. The opening patterns have intervals ranging from 0.5 to 2.0 mm and a size ranging from 0.1 to 2.0 mm, and can support existing forming processes, such as pad printing, screen printing, and spray coating. Further, the transmissive reflective layer 7 can also control the reflection factor and transmissivity by changing a film thickness thereof. The forming process thereof in this case can be supported by repeated application according to an existing process such as a coating method.

A distance between the transparent or translucent sheet 8 and the envelope 6 is desirably greater than the intervals of the opening patterns in the transmissive reflective layer 7. This is because, though luminance distribution defined by the opening patterns appears in the transmissive light immediately after transmission through the transmissive reflective layer 7, the luminance unevenness is resolved since the light is diffused in a space between the transmissive reflective layer 7 and the envelope until reaching the envelope 6.

The lower reflector 4 can attain a high reflection factor by using a reflective sheet, and can more simply be formed by applying a resist having a high reflection factor to the upper surface of the circuit board 3.

The point light source 5 of white or any other color is applicable, and is not limited by the type of the point light source 5. If an LED light source is formed by collectively arraying a plurality of LED chips and by covering the chips with a fluorescent material, a color difference appears between the center and periphery of the light source due to a difference in degree of fluorescent transformation. With the transmissive reflective layer 7 described above, even such a light source can hinder a color difference from appearing, depending on the light emitting direction from the lighting device.

Since the point light source 5 emits light within a small area, if there is not the transmissive reflective layer 7, the light source may be glared. In this embodiment, an apparent light source image is magnified to an area of the transmissive reflective layer 7 by the transmissive reflective layer 7 and greatly relaxes the glare. This effect can be enhanced in accordance with the size of the transmissive reflective layer 7.

According to the configuration described above, a bulb-type lighting device is obtained which excels in light use efficiency, can easily control the light distribution and luminance distribution, and has a desired light distribution.

FIG. 1B shows the bulb-type lighting device according to a first modification. According to the first modification, the translucent sheet 8 is formed flat as to be substantially in parallel with the lower reflector 4 above the point light source 5, and the transmissive reflective layer 7 is formed on the surface in the side of the point light source 5 of the translucent sheet 8. In addition, a group of lenses 9 are arranged on the upper surface of the translucent sheet 8. The lenses 9 can be molded simultaneously when the translucent sheet 8 is molded, or can also be created through processing before or after molding, such as screen printing. By using the lenses 9 together, transmitted light can be converged in a desired direction.

FIG. 1C shows a bulb-type lighting device according to a second modification. According to the second modification, the translucent sheet 8 has a circular conical region 8b whose vertex exists in the side of the point light source 5 above the point light source 5, and the reflection factor of the transmissive reflective layer 7 is designed to be high in the circular conical region 8b.

According to the lighting device configured as described above, most of the light coming from the point light source 5 reaches the circular conical region 8b of the translucent sheet 8, and is principally reflected in a perpendicular direction of the circular cone by the transmissive reflective layer 7. That is, the main axis of light rays scattered from the transmissive reflective layer 7 is configured to face in sideward or backward directions of the bulb. Therefore, the light distribution of the light extracted to the side of the envelope 6 spreads in sideward directions, and can achieve a wide light distribution close to a conventional incandescent bulb. Thus, by controlling the shape of the translucent sheet 8 or the reflection factor distribution of the transmissive reflective layer 7, the light distribution of the bulb can be suitably controlled.

In addition, in the first and second modifications, other features of the configuration of the lighting device are the same as those of the first embodiment described above. Identical parts are respectively denoted by identical reference symbols, and detailed descriptions thereof will be omitted.

Figure 2B:
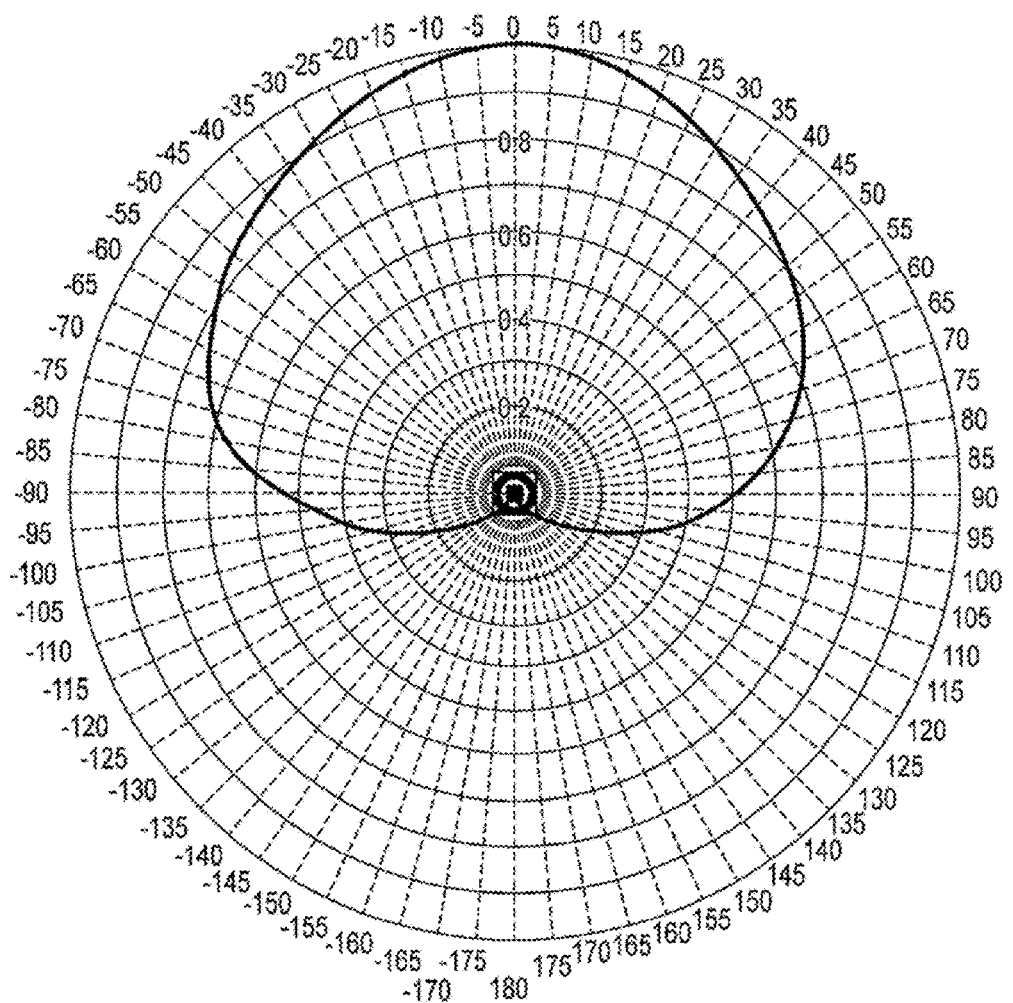
FIG. 2B shows measured values of light distribution of the lighting device according to the second modification.

FIG. 2A shows measured values of light distribution of a lighting device which does not comprise the optical control member according to the foregoing embodiment, and the light distribution characteristic is about 90 degrees at full angle at half maximum. FIG. 2B shows the light distribution of a lighting device according to the present embodiment, e.g., measured values of light distribution of a lighting device according to the second modification shown in FIG. 1C. A comparison of light distribution between these apparatuses shows that the light distribution spreads in sideward directions from the point light source 5 and also spreads behind the point light source 5. Accordingly, a desired light distribution suitable for a ceiling lamp can be obtained.

Figure 3A:
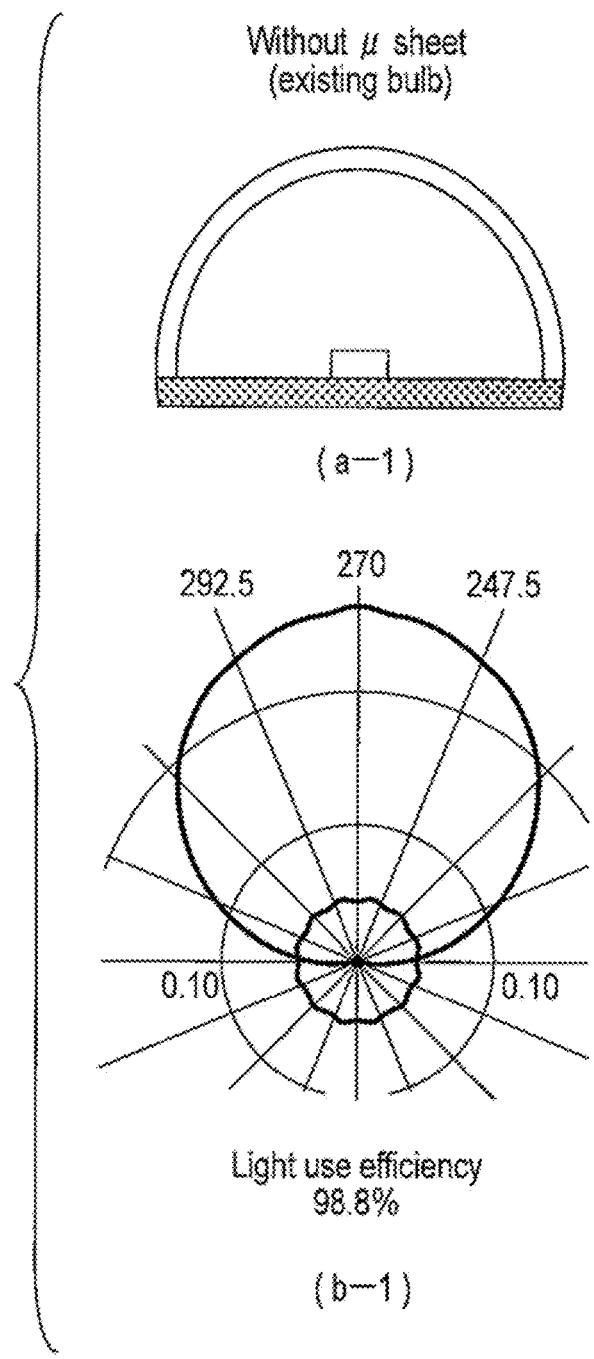
FIG. 3A shows a schematic configuration and light use efficiency of a lighting device according to a comparative example.
Figure 3C:
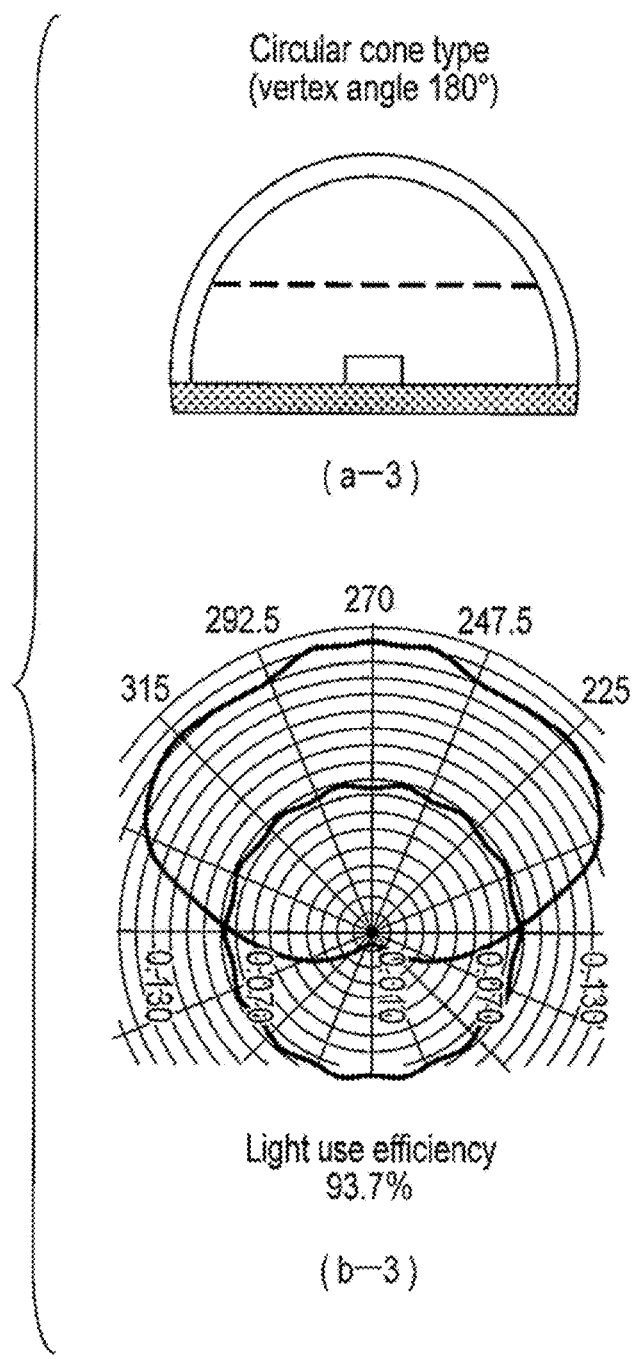
FIG. 3C shows a schematic configuration and light use efficiency of the lighting device according to the embodiment.
Figure 3D:
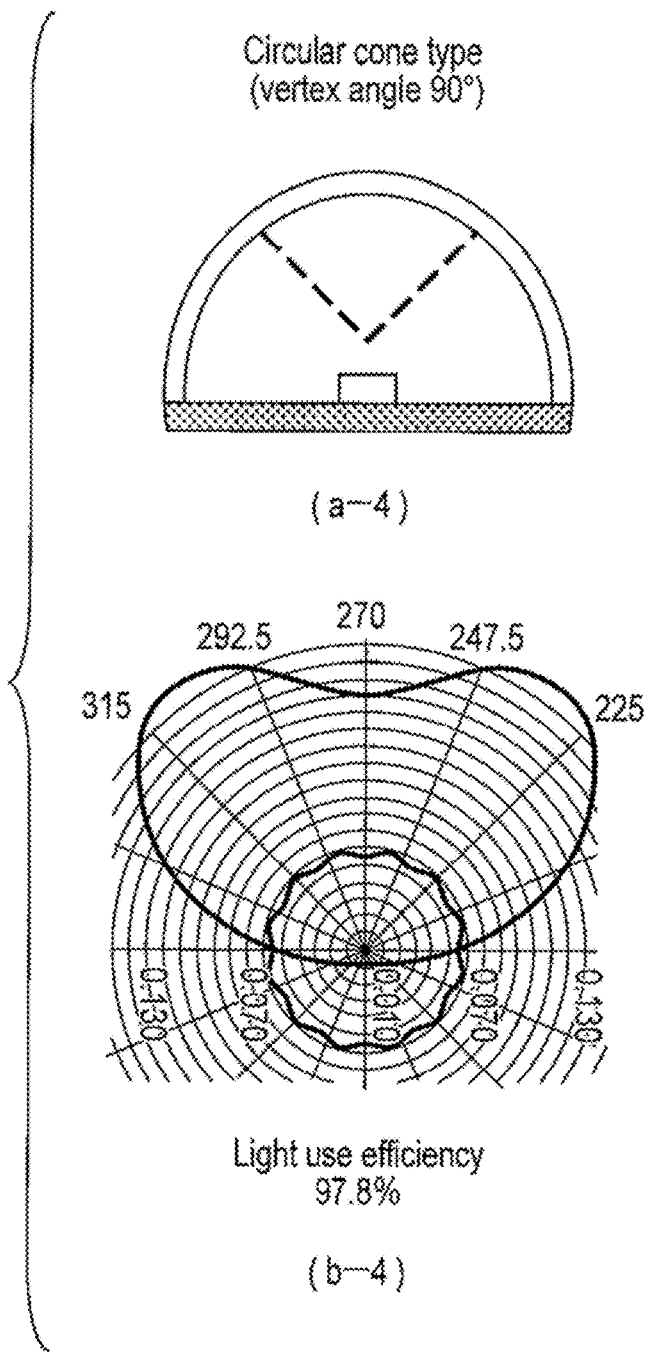
FIG. 3D shows a schematic configuration and light use efficiency of the lighting device according to the embodiment.

FIGS. 3A, 3B, 3C, and 3D show results of light use efficiency and light distribution analysis when various shapes of translucent sheets 8 and transmissive reflective layers 7 were used in a lighting device according to comparative example (existing bulbs) and the first embodiment shown in FIG. 1A. In FIG. 3A, (a-1) and (b-1) respectively show the light use efficiency and light distribution of a bulb comprising neither the translucent sheet 8 nor the transmissive reflective layer 7. As is known from the comparison above, since the translucent sheet 8 and the transmissive reflective layer 7 are configured in a circular conical shape toward the point light source 5 ((a-3) and (b-4) in FIG. 3C and (a-4) and (b-4) in FIG. 3D), the light reflected by the transmissive reflective layer 7 is radiated effectively toward the sides, and the number of reflections inside the lighting device is reduced. Accordingly, the light emission efficiency is improved, and the strength in sideward light distribution can be improved.

Figure 4A:
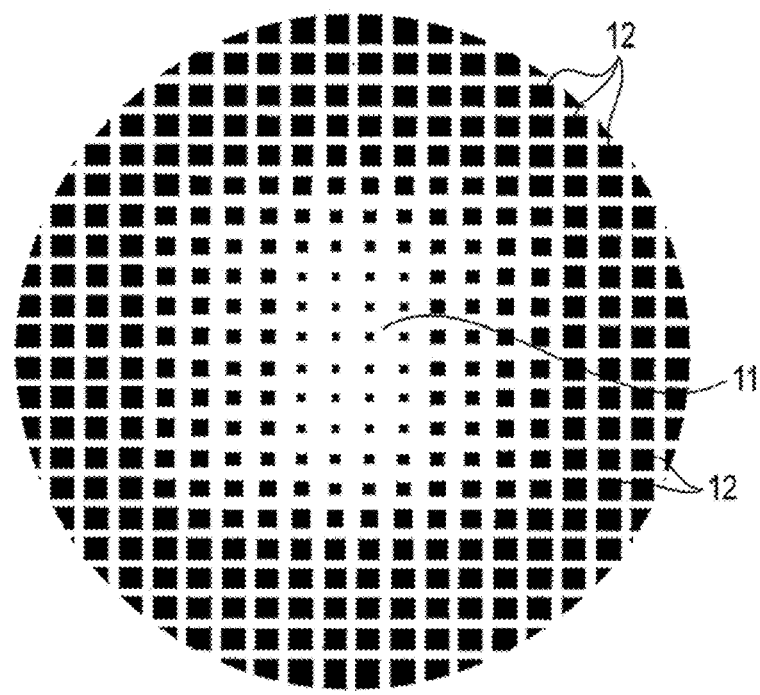
FIG. 4A is a plan view showing a pattern forming the transmissive reflective layer according to the embodiment, developed in a polar coordinate system centering on an optical axis of the lighting device.
Figure 4B:
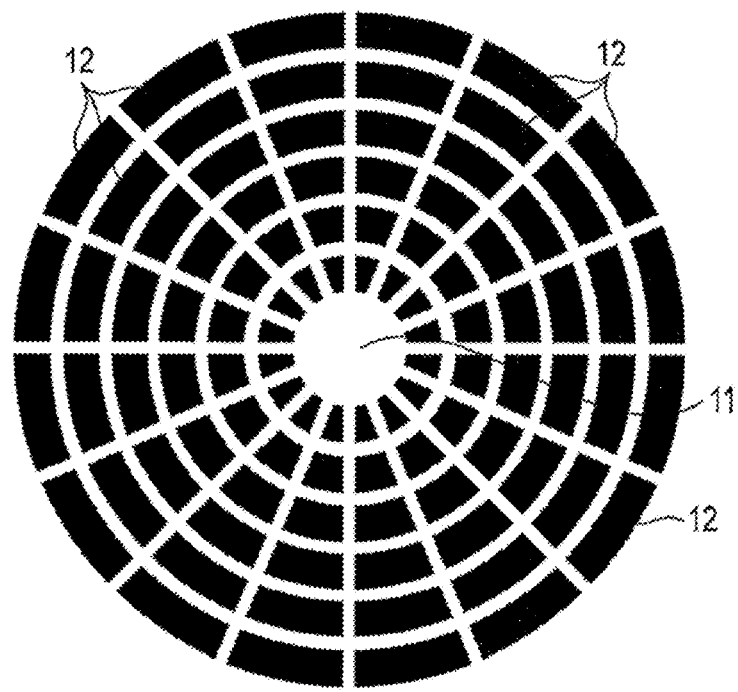
FIG. 4B is a plan view showing a pattern forming a transmissive reflective layer according to another embodiment, developed in a polar coordinate system centering on an optical axis of a lighting device.
Figure 4C:
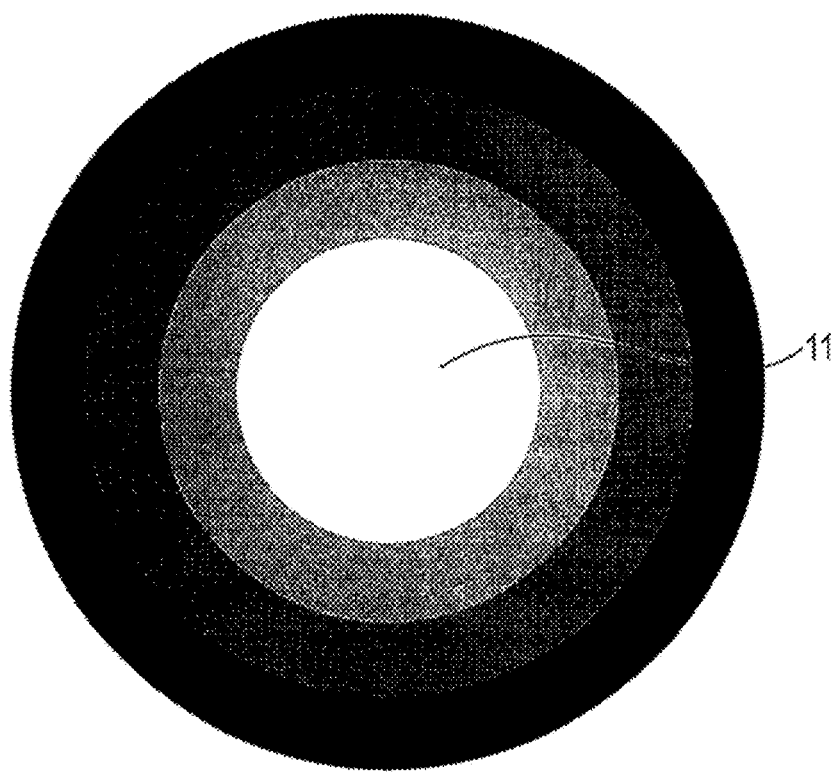
FIG. 4C is a plan view showing a pattern formed in a transmissive reflective layer according to another embodiment, developed in a polar coordinate system centering on an optical axis of a lighting device.

FIG. 4A, FIG. 4B, and FIG. 4C are developed views showing patterns formed in the transmissive reflective layer 7 as described above, developed in a polar coordinate system centering on the optical axis of the lighting device. According to the embodiment shown in FIG. 4A, transmissive parts 12 which transmit light are formed in the transmissive reflective layer 7. In a remaining part where the transmissive parts 12 are not formed, a reflective part 11 is formed which reflects 60% or more of light and transmits 40% or less of light. That is, the present embodiment comprises a configuration of a whole-type transmissive reflective layer 7, and a plurality of transmissive parts 12 are patterned on the reflective part 11 at uniform intervals. In this manner, the transmissive reflective layer 7 partially transmits and partially reflects light, thereby achieving a desired light distribution.

FIG. 4B shows an example in which opening patterns of the transmissive reflective layer 7 are formed on a polar coordinate system, and pattern intervals are equal in radial directions. In a point light source, such as an LED, the amount of light which enters the transmissive reflective layer 7 from the light source can be expressed as a function of a radius vector and a deflection angle about a part directly above the light source, as a center. Opening patterns with a numerical aperture distribution which is more suitable for the light amount distribution of light entering the transmissive reflective layer 7 can be formed in compliance with restrictions of resolution in existing pattern-forming processes, such as screen printing. Accordingly, the patterns are arranged in a manner that, the greater the numerical aperture and the more distant from a light source the region is, the wider the pattern opening pattern pitch is in the circumferential direction.

FIG. 4C shows an example in which the transmissive reflective layer 7 is formed by repeated overlapping printing of the uniform reflective part 11 which does not have an opening pattern. Shapes of overlapped printed layers are not limited to symmetrical circles as shown in the figure and can be arbitrarily set in compliance with the light distribution of the point light source used and/or the desired light distribution. Such a transmissive reflective layer 7 without an opening pattern can bring about the scattering of all the light emitted from the light source by the transmissive reflective layer 7, and can control the strength of the effect according to the position by the thickness of the layer 7.

FIGS. 5A and 5B respectively show bulb-type lighting devices according to the third and fourth modifications. According to the third and fourth modifications, the translucent sheet 8 has a circular conical region 8b which has a peak in the side of the point light source 5 above the point light source 5, and the transmissive reflective layer 7 is designed to have a high reflection factor in the region 8b.

That is, as shown in FIG. 5A, according to the third modification, the transmissive reflective layer 7 is formed in the upper surface side of the translucent sheet 8. The translucent sheet 8 and the transmissive reflective layer 7 have the circular conical region 8b. The circular conical region 8b is formed to be symmetrical through the whole circumference about the point light source 5 as a center. The translucent sheet 8 is formed in a shape which does not perfectly cover the point light source 5 but has an opening. That is, the translucent sheet 8 has an opening in a central part thereof, and is provided on the lower reflector 4 with the point light source 5 positioned in the opening.

Furthermore, the transmissive reflective layer 7 is designed to be open so as to maximize the reflection factor and thickness throughout the whole surface. The light (denoted by a broken arrow) coming from the point light source 5 in sideward directions is shut off and reflected by the transmissive reflective layer 7 (denoted by a solid arrow). The light finally emitted from the envelope 6 achieves a light distribution converged in the illumination direction. By using the translucent sheet 8 and transmissive reflective layer 7 as described above, the directivity can be arranged in an optical axis of the point light source 5, without spreading the light distribution of the lighting device.

As shown in FIG. 5B, according to the fourth modification, the transmissive reflective layer 7 is formed in the upper surface side of the translucent sheet 8. The translucent sheet 8 and the transmissive reflective layer 7 have the circular conical region 8b. The circular conical region 8b does not perfectly cover the point light source 5 but is shaped to have an opening. That is, the translucent sheet 8 has an opening in a central part thereof, and is provided on the lower reflector 4 with the point light source 5 positioned in the opening. The translucent sheet 8 and the transmissive reflective layer 7 are formed in a manner such that normal directions at the center of the opening are shifted from the optical axis direction of the point light source 5. In this case, the light emitted from the point light source 5 is reflected by the transmissive reflective layer 7. The light finally emitted from the envelope 6 achieves a light distribution which is converged, inclined along the normal directions of the translucent sheet 8 at the center of the opening.

Next, a planar lighting device according to a second embodiment will be described, referring to the drawings.

FIG. 6A shows a planar lighting device according to the second embodiment. The lighting device 10 comprises a housing 14 having a rectangular box shape whose upper surface is open, and a diffusion plate 13 fixed to the housing so as to cover the opening of the housing. The diffusion plate 13 is parallel to a bottom wall 14a of the housing 14 with a gap maintained therebetween. An outer surface of the diffusion plate 13 forms a planar radiation surface of the lighting device 10.

A reflective layer 15 is formed on the entire inner surfaces of the housing 14. On the bottom wall 14a, a plurality of point light sources 5 are provided at an interval on the reflective layer 15. For example, an LED is used as each point light source 5. Between these point light sources 5 and the diffusion plate 13, an optical control member 20, which comprises a transparent sheet 8 and a transmissive reflective layer 7 and is, for example, 0.1 to 1.0 mm thick, is provided and is fixed to the housing 14.

The transparent sheet 8 is provided to face substantially the whole surface of the diffusion plate 13, and the transmissive reflective layer 7 is formed on a surface of the transparent sheet 8 on the side of the point light sources 5. As in the foregoing first embodiment, the transmissive reflective layer 7 has desired opening patterns, reflection factor distribution, and transmission distribution. When a plurality of point light sources 5 are provided in line, the transmissive reflective layer 7 has a transmissivity distribution in which the transmissivity increases as the distance from each point light source 5 increases in the same periodical structure as the point light sources 5 are arranged. In this manner, even if the lighting device is configured to be thin, a strong light above the point light sources 5 is reflected and propagated to the circumference, thereby uniformly equalizing the luminance above the diffusion plate 13. Thus, the optical control member 20 has optical characteristics of transmission, diffraction, diffusion, and reflection, which vary for each region. The distribution of each of the optical characteristics is determined by positions relative to a point light source 5, and is controlled by at least one of a reflective film having a reflection factor distribution and a reflective film having a numerical aperture distribution, and lenses. By providing such an optical control member 20, the surface luminance on the diffusion plate 13 of the lighting device 10 can be equalized uniformly.

The optical control member 20 has convex parts 22 which each protrude in a circular conical shape toward the point light sources 5 directly above the point light sources 5. With this conical shape, reflection light can be effectively spread over the whole surface by the operation as described above, and the efficiency can be improved in comparison with the configuration (a). Owing to the conical convex parts 22, larger spaces than a pattern pitch of the transmissive reflective layer are provided between the transmissive reflective layer 7 and the diffusion plate 13. The pattern of the transmissive reflective layer 7 is configured to be not projected to the diffusion plate 13.

According to the foregoing configuration, the planar lighting device which excels in light use efficiency, has a light weight, and can be thinned can be provided.

FIG. 6B shows a planar lighting device according to the fifth modification. According to the fifth modification, an optical control member 20 is formed separately for each of point light sources 5, and is provided on the bottom wall 14a of the housing 14 so as to cover a corresponding one of the point light sources 5. The optical control members 20 respectively have convex parts 22 which each protrude in a circular conical shape toward the point light sources directly above the point light sources 5.

Other features of the configuration of the lighting device are the same as those of the lighting device according to the second embodiment. Identical parts are respectively denoted by identical reference symbols, and detailed descriptions thereof will be omitted.

According to the configuration described above, the optical control member 20 can reduce the area of the transparent sheet 8 while maintaining the same functions as those of the second embodiment described above. In this manner, when the optical control member is manufactured, the production efficiency can be improved by creating multiple patterns since the area is reduced, and manufacturing costs can be reduced.

In the fifth modification, other features of the configuration of the lighting device are the same as those of the lighting device according to the second embodiment. Identical parts are respectively denoted by identical reference symbols, and detailed descriptions thereof will be omitted.

FIG. 6C shows a planar lighting device according to the sixth modification. According to the sixth modification, a sheet-type optical control member 20 which has a transparent sheet 8 and a transmissive reflective layer 7 is provided on the bottom wall 14a of the housing 14, and has a region along a light source surface, i.e., a region in contact with the bottom of the housing 14 here. The whole of this region is a mat reflective film 7d. Regions of the optical control member 20 which face the point light sources 5 are each formed in a dome shape protruding toward the side of the radiation surface so as to cover the point light sources 5. Further, the optical control member 20 has convex parts 22 which each protrude in a circular conical shape toward the point light sources 5 directly above the point light sources 5.

Other features of the configuration of the lighting device are the same as those of the lighting device according to the second embodiment. Identical parts are respectively denoted by identical reference symbols, and detailed descriptions thereof will be omitted.

A large number of unillustrated members which absorb light, such as wiring, connectors, and an LED substrate, are provided on the bottom of the housing 14. There is a limit to the reflection factor of the housing reflective layer 15 as a base. Therefore, the mat reflective film 7d covers these low reflective members and functions as a lower reflective layer. Accordingly, a reflective layer to the side of the light source substrate requires management only in the vicinity of the point light sources 5. In this manner, manufacturing costs can be reduced, and the luminous efficiency can be improved.

Figure 7:
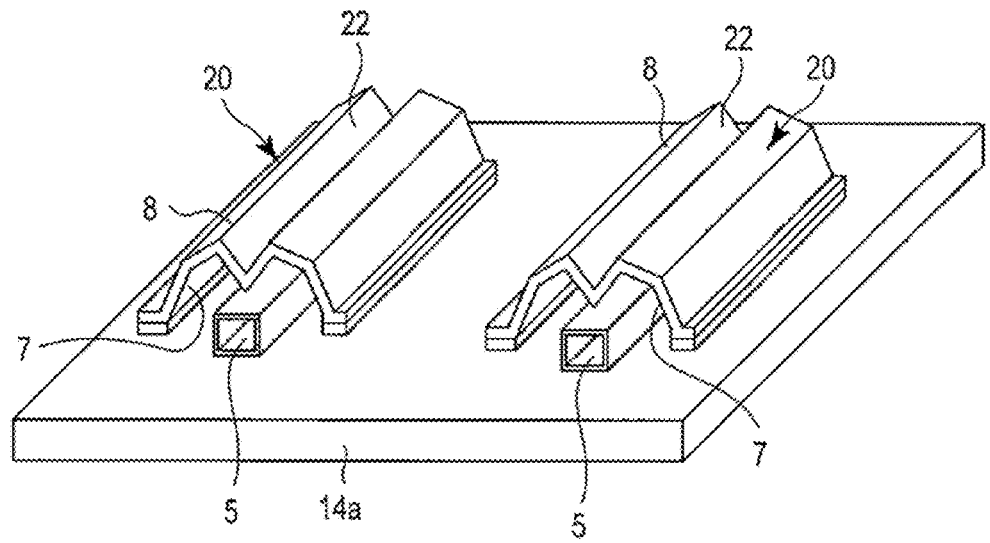
FIG. 7 is a perspective view schematically showing light sources and an optical control member in a lighting device according to a modification.

The configurations of the second embodiment and fifth and sixth modifications described above comprise an array of a plurality of point light sources 5 with a sufficient distance maintained between them. Without the limitation to this configuration, linear light sources as shown in FIG. 7 or point light sources may be configured to be arrayed closely in a certain direction. In this case, the shape of the translucent sheet 8 and the transmissive reflective layer 7 may be elongated in the same one-dimensional direction as a direction in which the light sources 5 extend. Simultaneously, elongated convex parts 22 protruding toward the light sources 5 may be provided. In such a configuration, the same operation and effect as the second embodiment can be obtained.

Figure 8:
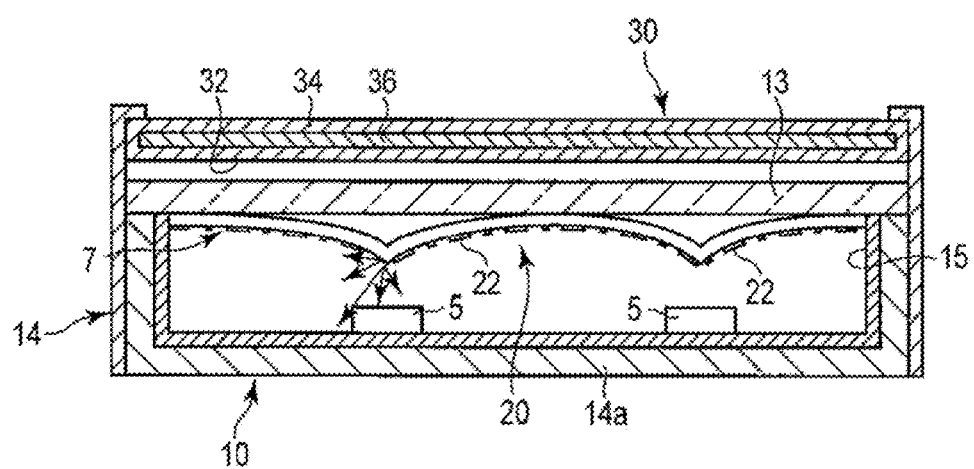
FIG. 8 is a sectional view showing a liquid-crystal display apparatus according to the third embodiment.

FIG. 8 shows a liquid-crystal display apparatus according to the third embodiment. The liquid-crystal display apparatus comprises, for example, a planar lighting device 10 which has the same configuration as the second embodiment described above, in which a liquid crystal display panel 30 is provided to face a radiation surface of the lighting device 10. The liquid-crystal display panel 30 comprises a rectangular array substrate 32, a rectangular counter substrate 34 facing the array substrate 32 with a gap maintained from the array board 32, and a liquid crystal layer 36 enclosed between the array substrate 32 and the counter substrate 34. The planar lighting device 10 which functions as a back light unit is provided to proximately face the array substrate 32 of the liquid-crystal display panel 30, and illuminates the liquid-crystal display panel 30 with light having a uniform luminance.

According to the configuration described above, by using the planar lighting device 10 as the back light unit, a liquid-crystal display apparatus can be provided which excels in light use efficiency, has a light weight, and can be thinned.

The present invention is not strictly limited to the foregoing embodiments and components thereof can be modified in practical phases without deviating from the subject matter of the invention. Various inventions can be achieved from appropriate combinations of a plurality of components disclosed in the embodiments. For example, several components may be removed from all the components disclosed in the embodiments. Further, components may be appropriately combined among different embodiments. For example, a sheet forming an optical control member is not limited to a translucent sheet but may be a transparent sheet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A lighting device comprising:
   a radiation surface;
   at least one light source provided to face the radiation surface; and
   an optical control member provided between the radiation surface and the light source and comprising optical characteristics of transmission, diffraction, diffusion, and reflection, which vary for regions in the optical control member, a distribution of each of the optical characteristics being determined by positions relative to the at least one light source, the optical control member being formed in a sheet shape which is controlled by at least one of a reflective film having a reflection factor distribution, a reflective film having a numerical aperture distribution, and lenses,
   wherein the optical control member comprises a group of patterns in a micro cycle, and a distance between the optical control member and the radiation surface is greater than the cycle of the group of patterns.

2. The lighting device according to claim 1, wherein the group of patterns of the optical control member are of a reflective film or lenses, and have a cycle of 0.5 to 2.0 mm and a radius of 0.1 to 2 mm.

3. The lighting device according to claim 1, wherein the optical control member comprises a transparent sheet, and a transmissive reflective layer formed on the transparent sheet, and is molded in a sheet shape with a thickness of 0.1 to 1.0 mm.

4. The lighting device according to claim 3, further comprising a light source substrate supporting the at least one light source, and a reflective layer formed on the light source substrate, wherein the optical control member is fixed to at least one of the light source substrate and the reflective layer.

5. The lighting device according to claim 1, wherein the optical control member is formed in a dome-shape covering the at least one light source and comprises a transmissivity distribution in compliance with an incident light distribution from the light source for each region.

6. The lighting device according to claim 1, wherein as regards the transmissivity distribution of the optical control member, the reflectivity increases the closer the region is to the at least one light source.

7. The lighting device according to claim 1, further comprising an envelope having a dome-shape forming the radiation surface, wherein as regards the transmissivity distribution of the optical control member, a reflectivity is low about a particular direction as a center.

8. The lighting device according to claim 1, wherein the optical control member is formed in a dome-shape whose top is recessed toward the light source.

9. The lighting device according to claim 1, wherein the optical control member is configured to surround the light source, comprises an opening above the light source, and is principally biased to the optical characteristic of reflection.

10. The lighting device according to claim 9, wherein the opening of the optical control member has an opening center whose direction viewed from the light source differs from an optical axis of the light source.

11. The lighting device according to claim 1, wherein the radiation surface is formed to be substantially flat, and the optical control member comprises a transmission distribution having a periodical structure which is repeated a number of times equal to a number of lines of the at least one light source or a multiple thereof, and a transmissivity in a region close to the light source has a smaller distribution than that of any other region of the optical control member.

12. The lighting device according to claim 11, wherein the optical control member is configured to cover only a region corresponding to the at least one light source, and has a smaller size than a size of the whole radiation surface.

13. The lighting device according to claim 11, wherein the optical control member comprises a dome-shaped region which protrudes toward the radiation surface from a light source surface, corresponding to the light source, and a region extending along the light source surface, and the region along the light source surface principally comprises an optical characteristic of reflection.

14. A liquid-crystal display apparatus comprising:
a liquid-crystal display panel; and
a lighting device provided to face the liquid-crystal display panel and configured to illuminate the liquid-crystal display panel with light,
the lighting device comprising:
a radiation surface;
at least one light source provided to face the radiation surface; and
an optical control member provided between the radiation surface and the light source and comprising optical characteristics of transmission, diffraction, diffusion, and reflection, which vary for regions in the optical control member, a distribution of each of the optical characteristics being determined by positions relative to the at least one light source, the optical control member being formed in a sheet shape which is controlled by at least one of a reflective film having a reflection factor distribution, and a reflective film having a numerical aperture distribution, and lenses.

15. The liquid-crystal display apparatus according to claim 14, wherein the optical control member comprises a group of patterns in a micro cycle, and a distance between the optical control member and the radiation surface is greater than the cycle of the group of patterns.

16. The lighting device according to claim 15, wherein the group of patterns of the optical control member are of a reflective film or lens, and have a cycle of 0.5 to 2.0 mm and a radius of 0.1 to 2 mm.

17. The lighting device according to claim 14, wherein the radiation surface is formed to be substantially flat, and the optical control member comprises a transmission distribution having a periodical structure which is repeated a number of times equal to a number of lines of the at least one light source or a multiple thereof, and a transmissivity in a region close to the light source has a smaller distribution than that of any other region of the optical control member.

* * * * *